(12) United States Patent
Gaggar et al.

(10) Patent No.: US 7,135,233 B2
(45) Date of Patent: Nov. 14, 2006

(54) MULTI-LAYER COMPOSITES

(75) Inventors: Satish K. Gaggar, Parkersburg, WV (US); Ke Feng, Vienna, WV (US); Donald M. Kulich, Marletta, OH (US); Christopher D. Willis, Lanesboro, MA (US); Craig Williams, Lenox, MA (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 10/690,398

(22) Filed: Oct. 20, 2003

(65) Prior Publication Data
US 2005/0084696 A1    Apr. 21, 2005

(51) Int. Cl.
*B32B 27/08* (2006.01)

(52) U.S. Cl. ............... 428/519; 428/297.4; 428/300.4; 428/520; 428/522

(58) Field of Classification Search ............ 428/297.4, 428/300.4, 519, 522, 520; 328/520
See application file for complete search history.

(56) References Cited

U.S. PATENT DOCUMENTS

| | | | |
|---|---|---|---|
| 2,976,259 A | 3/1961 | Hardy et al. | |
| 3,043,709 A | 7/1962 | Amborski | |
| 3,049,443 A | 8/1962 | Coleman et al. | |
| 3,214,436 A | 10/1965 | Boyle et al. | |
| 3,238,275 A | 3/1966 | Calvert et al. | |
| 3,309,220 A | 3/1967 | Osteen et al. | |
| 3,582,398 A | 6/1971 | Ringler et al. | |
| 3,711,575 A | 1/1973 | Kakefuda et al. | |
| 3,968,305 A | 7/1976 | Oshima et al. | |
| 3,968,309 A | 7/1976 | Matsuo et al. | |
| 4,178,303 A | 12/1979 | Lorenz et al. | |
| 4,260,768 A | 4/1981 | Lorenz et al. | |
| 4,310,650 A | 1/1982 | Gupta et al. | |
| 4,556,606 A | 12/1985 | Olson | |
| 4,731,414 A | 3/1988 | Ting | |
| 4,831,079 A | 5/1989 | Ting | |
| 4,910,067 A | 3/1990 | O'Neill | 428/139 |
| 6,448,332 B1 | 9/2002 | Hughes | 525/64 |
| 6,589,378 B1 * | 7/2003 | Grefenstein et al. | 156/222 |
| 2002/0045056 A1 | 4/2002 | Grefenstein et al. | 428/515 |
| 2003/0162895 A1 | 8/2003 | Gaggar et al. | 525/70 |
| 2004/0146714 A1 | 7/2004 | McCollum et al. | 428/411.1 |

* cited by examiner

*Primary Examiner*—D. S. Nakarani
(74) *Attorney, Agent, or Firm*—Marina Larson & Associates, LLC (57) ABSTRACT

Multi-layer composite structures offer improved weatherability and adhesion to fiber-reinforced plastic substrates when compared to structures now available. These composites have an outer layer made from a polyacrylate, a second layer made from an acrylonitrile-styrene-acrylate rubber terpolymer; a third layer made from an ABS polymer; and optionally a fourth layer made from a polyacrylate. The layers include one or more layers having an improvement selected from among: (a) the improvement wherein the second layer is made from an acrylate-modified acrylonitrile-styrene-acrylate rubber terpolymer; (b) the improvement wherein the third layer is a modified ABS that further includes a polymer modifier that decreases the softening of the ABS on contact with styrene, and an acrylonitrile-styrene-acrylate rubber terpolymer; and (c) the improvement wherein the fourth layer is present and is a polyacrylate. This composite can be applied to a fiber-reinforced plastic substrate such as fiberglass as a coating.

26 Claims, 5 Drawing Sheets

MULTI-LAYER COMPOSITES

BACKGROUND OF INVENTION

This application relates to composites having improved characteristics that have improved weatherability and inter-layer adhesion when a fiber-reinforced plastic substrate is part of the composite.

Figure 1:
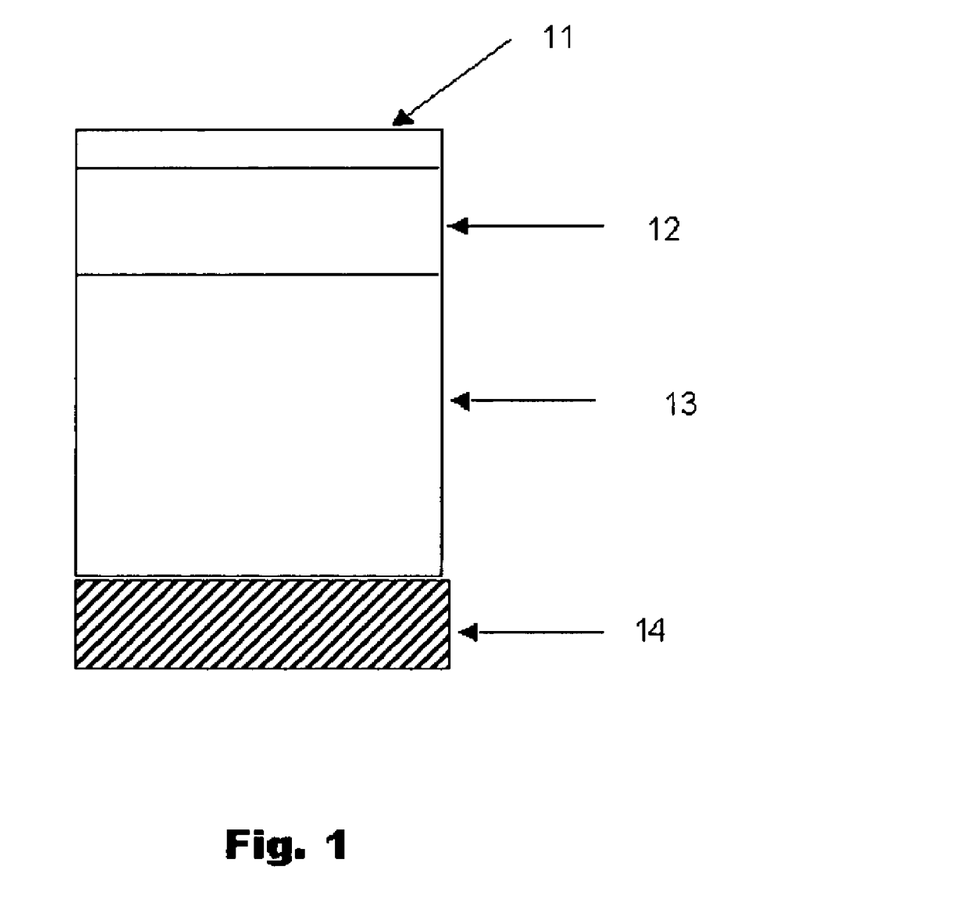
FIG. 1 shows a schematic representation of a layered composite in accordance with the prior art.

FIG. 1 shows the structure of a composite that is known in the art. The composite has four layers, a top layer 11, which is comprising an acrylic, a second layer 12 which is formed from an amorphous acrylonitrile-styrene-acrylate rubber terpolymer (ASA), a third layer 13 comprising acrylonitrile-butadiene-styrene terpolymer (ABS) and a fiber-reinforced plastic substrate 14.

Material consisting of layers 11, 12 and 13 is marketed in sheet form under the tradename Weather-Pro G by Spartech Corporation, and the sheets of material are thermoformed into boat hulls and other shapes to be the outer skin on fiber reinforced plastic substrate 14.

SUMMARY OF INVENTION

The present invention provides improved multi-layer composite structures that offer improved weatherability and adhesion to fiber-reinforced plastic substrates when compared to structures now available. The invention includes several improvements that can be used individually or in combination. Thus, stated generally, the invention provides a composite comprising, in sequence, an outer layer comprising a polyacrylate, a second layer comprising an acrylonitrile-styrene-acrylate rubber terpolymer;

a third layer comprising an ABS polymer; and optionally a fourth layer comprising a polyacrylate, wherein the layers include one or more layers having an improvement selected from among:

(a) the improvement wherein the second layer comprises an acrylate-modifiedacrylonitrile-styrene-acrylate rubber terpolymer;

(b) the improvement wherein the third layer is a modified ABS that further comprises a polymer modifier that decreases the softening of the ABS on contact with styrene, and an acrylonitrile-styrene-acrylate rubber terpolymer; and (c) the improvement wherein the fourth layer is present and is a polyacrylate.

These composites can be produced as a sheet, for example by coextrusion, thermoformed if desired, and then be used as a coating on fiber reinforced plastic structure, for example fiberglass. The resulting coated structures have better weatherability, when the improved second layer is used, particularly when UV stabilizer is included in the first layer, and better adhesion between the coating and the fiber reinforced plastic substrate when the modified ABS and/or polyacrylate fourth layer are used.

DETAILED DESCRIPTION

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used to determine the value.

In addition, the polymers referred to herein are ordinary commercial grades, and need not be 100% pure, or contain exclusively the stated monomer. By way of example, commercial polymethylmethacrylate commonly include minor amounts of comonomers to modify the proprties of the polymer, and ABS and ASA commonly include additives such as flow promoters, stabilizers, metal release agents and the like.

This application relates to thermoformable composites having improved weatherability and inter-layer adhesion, and to fiber reinforced plastic structures when coated with the thermoformable composite.

Figure 2A:
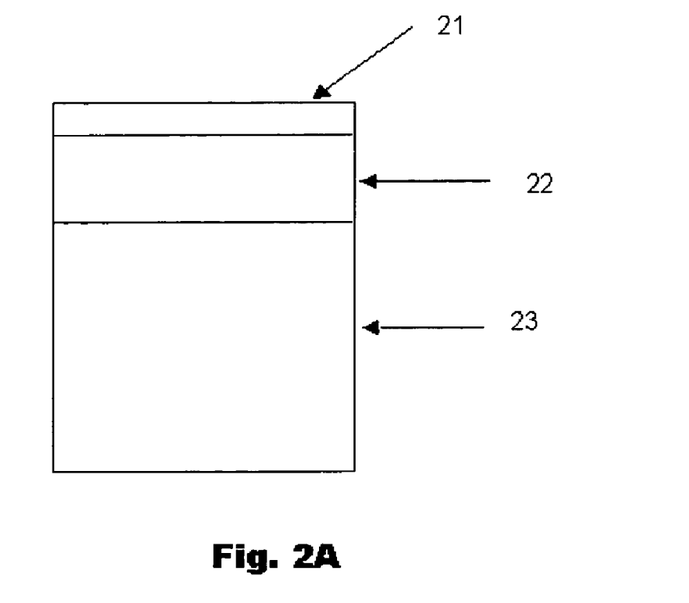
FIGS. 2A and 2B show a schematic representation of a thermoformable composite in accordance with a first embodiment of the invention, before and after application to a fiber reinforced panel.
Figure 2B:
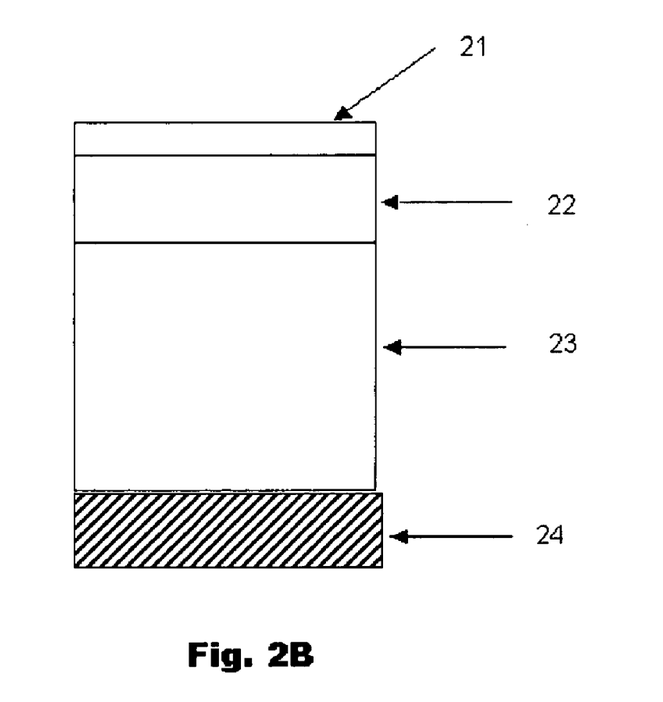

FIGS. 2A and B show a schematic representation of a first embodiment of the invention. FIG. 2A shows the structure of the thermoformable composite. The composite has three layers, an, outer layer 21 comprising UV stabilized acrylic, a second layer 22 comprising acrylate-modified acrylonitrile-styrene-acrylate rubber terpolymer (ASA), and a third layer 23 comprising ABS. As shown in FIG. 2B, this composite can be application to a fiber-reinforced plastic substrate 24.

Figure 3A:
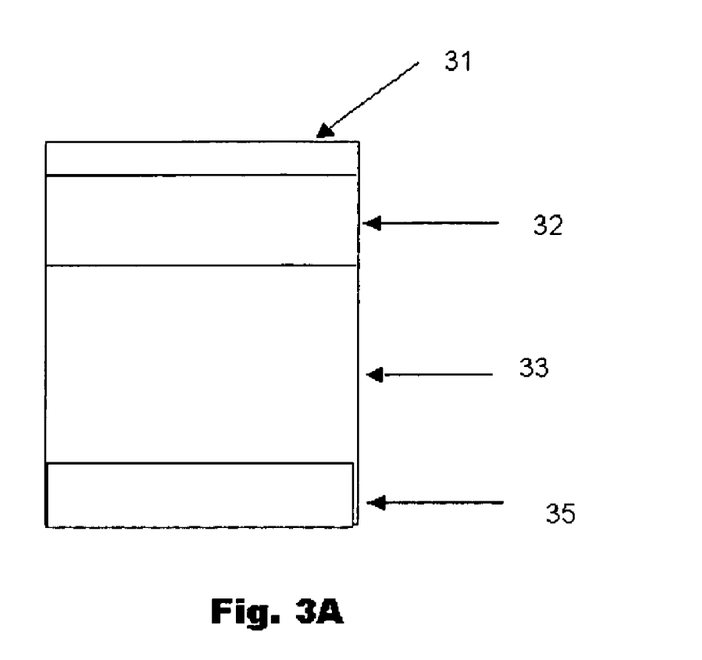
FIGS. 3A and 3B show a schematic representation of a thermoformable composite in accordance with a second embodiment of the invention, before and after application to a fiber reinforced panel.
Figure 3B:
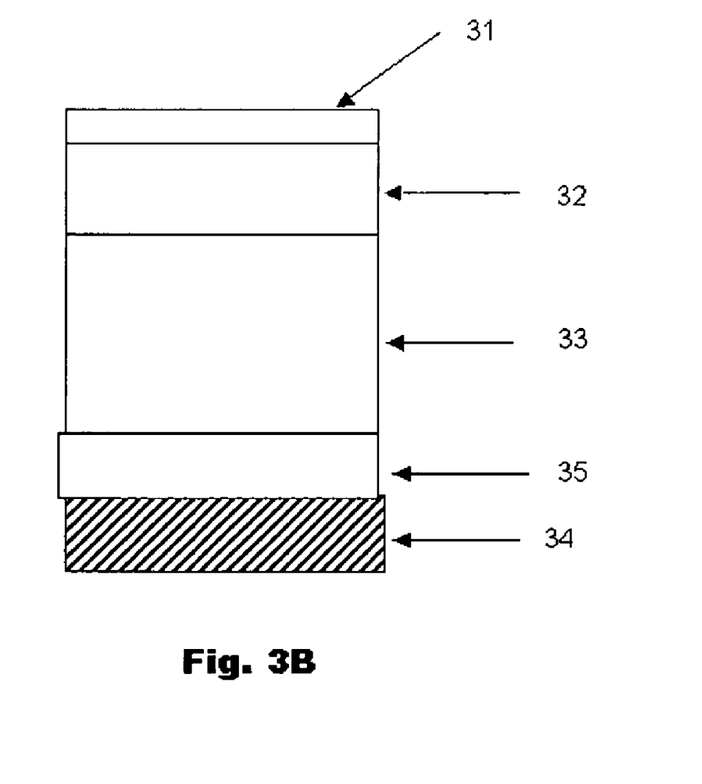

FIGS. 3A and B show a schematic representation of a second embodiment of the invention. FIG. 3A shows the structure of the thermoformable composite. The composite has four layers, an outer layer 31 comprising UV stabilized acrylic, a second layer 32 comprising acrylate-modified acrylonitrile-styrene-acrylate rubber terpolymer (ASA), a third layer 33 comprising a modified acrylonitrile-butadiene-styrene terpolymer (ABS), and a fourth layer 35 comprising acrylic. As shown in FIG. 3B, this composite can be application to a fiber-reinforced panel substrate 34.

Figure 4A:
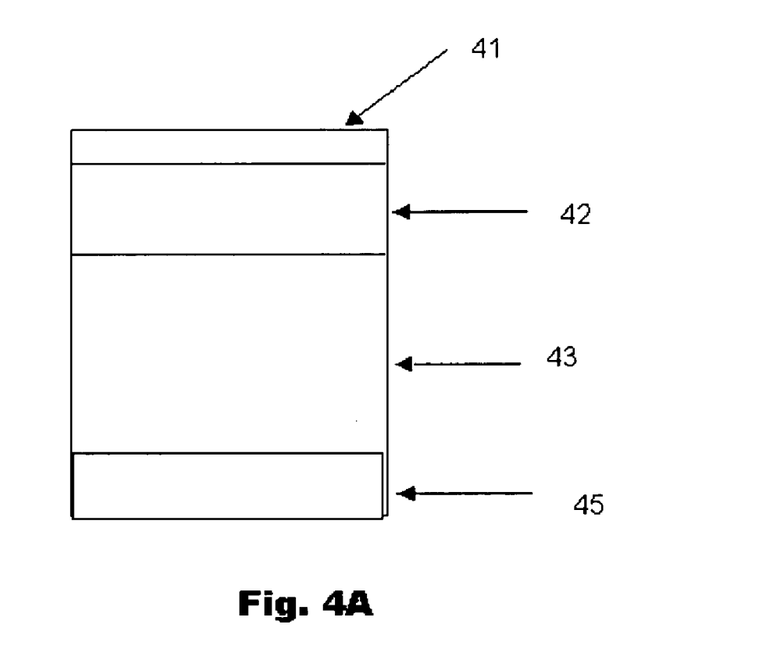
FIGS. 4A and 4B show a schematic representation of a thermoformable composite in accordance with a second embodiment of the invention, before and after application to a fiber reinforced panel.
Figure 4B:
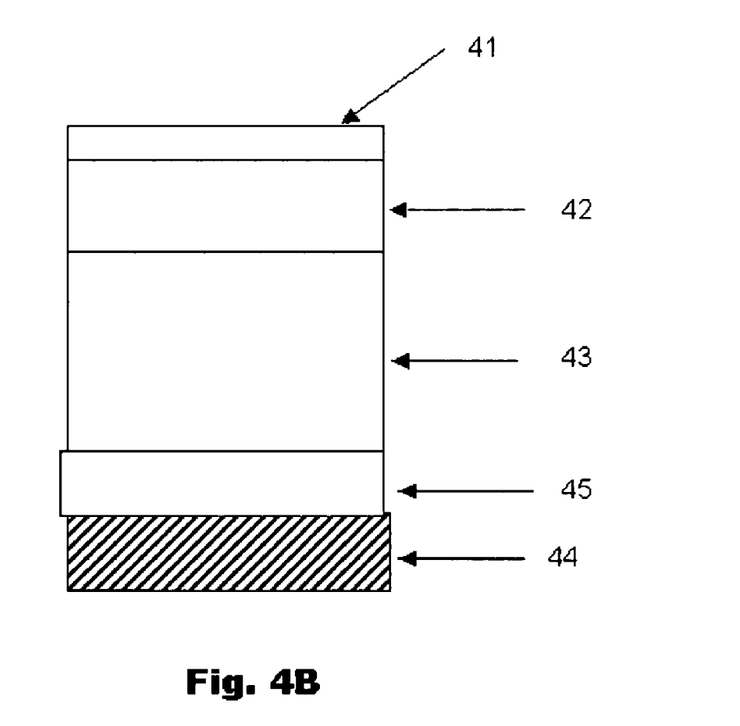

FIGS. 4A and B show a schematic representation of a second embodiment of the invention. FIG. 4A shows the structure of the thermoformable composite. The composite has four layers, an outer layer 41 comprising acrylic, a second layer 42 comprising rubber-modified acrylonitrile-styrene-acrylate rubber terpolymer (ASA), a third layer 43 comprising a modified acrylonitrile-butadiene-styrene terpolymer (ABS), and a fourth layer 45 comprising acrylic. As shown in FIG. 4B, this composite can be application to a fiber-reinforced panel substrate 44.

In the embodiments of the invention that comprise a UV stabilized polyacrylate as the outer layer, preferred embodiments have outer layers that consist essentially of UV stabilized polyacrylate. UV stabilized acrylics have been used in outdoor applications for some time (See for example U.S. Pat. Nos. 4,556,606, 3,582,398, 4,178,303, 4,260,768 and 4,310,650 which are incorporated herein by reference). Suitable polyacrylates for use in layers 21, 31, and 41 include without limitation thermoplastic acrylics and thermosetting acrylics, with the most preferred coating composition being polymethylmethacrylate and copolymers thereof. The same acrylics can be employed as the acrylic layer 45, when that layer is present in the composite.

The thermoplastic acrylic polymers which are employed herein are well known in the art. Exemplary thermoplastic acrylic polymers are set forth, for example, in Encyclopedia of Polymer Science and Technology, Vol. 1, Interscience Publishers, John Wiley and Sons, Inc., 1964 at page 246 et. seq., and the references cited therein, all of which are hereby incorporated by reference.

The term "thermoplastic acrylic polymers" as used herein is meant to embrace within its scope those thermoplastic polymers resulting from the polymerization of one or more acrylic acid ester monomers as well as methacrylic acid ester monomers. These monomers are represented by the general formula $CH_2=CYCOOR^1$ wherein Y is hydrogen or a methyl radical and R.sup.1 is an alkyl radical preferably an alkyl radical containing from 1 to about 20 carbon atoms.

Some nonlimiting examples of alkyl groups represented by R.sup.1 include methyl, ethyl, n-propyl, isopropyl, n-butyl, isobutyl, sec-butyl, tert-butyl, pentyl, isopentyl, hexyl, and the like.

Some nonlimiting examples of acrylic acid ester monomers represented by formula V include methyl acrylate, isopropyl acrylate, n-propyl acrylate, n-butyl acrylate, isobutyl acrylate, and 2-ethylhexyl acrylate. Some nonlimiting examples of methacrylic acid ester monomers represented by formula V include methyl methacrylate, ethyl methacrylate, butyl methacrylate, hexyl methacrylate, isobutyl methacrylate, and propyl methacrylate. Copolymers of the above acrylate and methacrylate monomers are also included within the term thermoplastic acrylic polymers as it appears herein. The polymerization of the monomeric acrylic acid esters and methacrylic acid esters to provide the thermoplastic acrylic polymers useful in the practice of this invention may be accomplished by any of the well known polymerization techniques. The thermoplastic acrylic polymers having a molecular weight of at leaast about 15,000 are generally preferred in the practice of the instant invention.

The thermoplastic acrylic polymers useful as coatings include acrylic homopolymers derived from a single type of acrylic acid ester monomer; methacrylic homopolymers derived from a single type of methacrylic acid ester monomer and copolymers derived from two or more different acrylic acid ester monomers, two or more different methacrylic acid ester monomers, or an acrylic acid ester monomer and a methacrylic acid ester monomer.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, can also be used.

Suitable thermoplastic coatings also include thermoplastic acrylic polymers containing functional groups. See e.g. U.S. Pat. Nos. 3,968,305 and 3,968,309, incorporated herein by reference.

The term "thermoplastic acrylic polymer containing functional groups" as used herein is meant to embrace within its scope those thermoplastic polymers resulting from the polymerization of one or more substituted acrylic or methacrylic acid ester monomers represented by the general formula $CH_2=CY-COOR^2Z$ wherein Y is hydrogen or a methyl radical; $R^2$ is a divalent saturated aliphatic hydrocarbon radical; and Z is a hydroxyl, carboxyl, amine, epoxide, amide, SH, $SO_3$, H, $COOR^3$, or $Si(OR^4)_3$ group, wherein $R^3$ and $R^4$ are alkyl groups, preferably alkyl groups containing from 1 to about 20 carbon atoms. $R^2$ is preferably a divalent saturated aliphatic hydrocarbon radical containing from 1 to about 20 carbon atoms. Copolymers resulting from the copolymerization of two substituted acrylic or methacrylic acid ester monomers are also included within the term thermoplastic arcylic polymer containing functional groups. Also included within this term are copolymers resulting from the copolymerization of acrylic acid ester monomers and/or methacrylic acid ester monomers represented by the general formula $CH_2=CY^1-COOR^5$ wherein $Y^1$ is hydrogen or a methyl radical and $R^5$ is an alkyl radical with the substituted acrylic acid ester or substituted methacrylic acid ester monomers of formula VI. Some nonlimiting examples of acrylic acid ester or methacrylic acid ester monomers of this type which can be copolymerized with the substituted acrylic or methacrylic acid ester monomers of formula VI to form the thermoplastic acrylic polymers containing functional groups include methyl acrylate, ethyl acrylate, butyl acrylate, 2-ethylhexylacrylate, methyl methacrylate, ethyl methacrylate, butyl methacrylate, hexyl methacrylate, and the like. Examples of copolymers of this type include copolymers obtained by the copolymerization of ethyl methacrylate and hydroxyethyl methacrylate, ethyl methacrylate and gamma-methacryloxypropyltrimethoxysilane, methyl acrylate and hydroxyethyl acrylate, and the like.

The polymerization of these substituted and unsubstituted acrylate and methacrylate monomers to provide the thermoplastic acrylic polymer containing functional groups useful in the practice of the present invention may be accomplished by any of the well known polymerization techniques.

The term thermoplastic acrylic polymer containing functional groups thus includes homopolymers obtained from the polymerization of a substituted acrylic or methacrylic acid ester monomer; copolymers obtained from the copolymerization of two substituted acrylic acid ester monomers; copolymers obtained from the copolymerization of two substituted methacrylic acid ester monomers; copolymers obtained from the copolymerization of a substituted acrylic acid ester monomer and a substituted methacrylic acid ester monomer; copolymers obtained by the copolymerization of a substituted acrylic acid ester monomer and a methacrylic acid ester monomer; copolymers obtained by the copolymerization of a substituted acrylic acid ester monomer and an acrylic acid ester monomer; copolymers obtained by the copolymerization of a substituted methacrylic acid ester monomer and an acrylic acid ester monomer; and copolymers obtained by the copolymerization of a substituted methacrylic acid ester monomer and a methacrylic acid ester monomer.

Mixtures of two or more of these acrylic homopolymers or copolymers can also be used in the practice of the present invention. Generally, it is preferred that the thermoplastic acrylic polymers containing functional groups have an average molecular weight of at least about 20,000 and preferably at least about 50,000.

Exemplary, nonlimiting, thermosettable acrylics which may be employed in the practice of this invention are disclosed, for example, in Encyclopedia of Polymer Science and Technology, Vol. 1, Interscience Publishers, John Wiley & Sons, Inc., 1964, at page 273 et seq., and in Chemistry of Organic Film Formers, by D. H. Solomon, John Wiley and Sons, Inc., 1967, at page 251 et seq., and the references cited therein, all of which are incorporated herein by reference.

These thermosettable acrylic polymers generally include: (I) acrylic copolymers having reactive functional groups which are capable of reacting between themselves to effect a cross-linkage thereof; (II) acrylic copolymers having reactive functional groups to which there is added an appropriate cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; expoxide functional groups and N-methylol or N-methylol-ether functional groups; carboxyl functional groups and N-methylol or N-methylol-ether functional groups; interraction between carboxyl and isocyanate groups; reactions between hydroxyl, for example polyols, and isocyanate groups; and reactions between amine groups and N-methylol or N-methylol-ether functional groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerized a monomer which supplies the needed reactive functional group into the polymer chain. Usually, this copolymerizable functional group-supplying monomer will be present in small amounts, that is, on the order of 25 weight percent or less, and typically, between about 1 and 20 weight percent of the monomer mass which is polymerized. Some non-limiting examples of these functional group supplying monomers include glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, styrene, or mixtures thereof, in an amount ranging between about 75 parts by weight to about 99 parts by weight and, more typically, between about 80 parts by weight to about 97 parts by weight.

Suitable UV stabilizers for use on layers 21 and 31 include without limitation oxalanilides, hydroxybenzophenones, hydroxyphenyl-s-triazines, and benzotriazoles which may be copolymerized or blended with the acrylic. Commercially available benzotriazole UV absorbers include TINUVIN 234, MIXXIM BB/200 and CYASORB 5411. Benzophenone derivatives and benzotriazole derivatives are disclosed in U.S. Pat. Nos. 3,309,220; 3,049,443; 3,043,709; 3,214,436; and 2,976,259 and U.S. Pat. No. Re. 2,976, all of which are incorporated herein by reference. Some non-limiting examples of these compounds include: 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4', 5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-methoxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiarybutylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4,4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; 2-hydroxy-4-ethoxy-4'-bromobenzophenone; 2-(2'-hydroxy-5'-methylphenyl)-benzotriazole; 2-(2'-hydroxy-5'-tert-butylphenyl)-benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chlorobenzotriazole; and 2-(2'-hydroxy-3'-di-tert-butylphenyl-benzotriazole.

The amount of ultraviolet radiation absorbing compound present in the coating composition is an effective amount to protect the underlying layers against degradation by ultraviolet radiation. Essentially, an effective amount of ultraviolet radiation absorbing compound is that amount wherein the absorbance of the ultraviolet radiation absorbing compound at λ maximum is at least 1, which corresponds to absorption at λ maximum of at least 90% of the incident ultraviolet radiation by the UV stabilizer coating composition. The absorbance is calculated using the relationship $A = \log(I_o/I)$ wherein A is the absorbance, $I_o$ is the intensity of incident light, and I is the intensity of transmitted light.

More specifically, but not by limitation, the acrylic outer layer in the compositions of the invention, when they contain a UV stabilizer, suitably contain from 0.01 to 5 weight percent of an ultraviolet radiation absorbing compound. Further, the acrylic layer may contain only one ultraviolet radiation absorber or a combination of two or more ultraviolet radiation absorbers. If two or more ultraviolet radiation absorbing compounds are present in the stabilizing coating compositions their combined weight percentages generally ranges noted above. Obviously, stabilizing compositions having higher concentrations of UV absorber than stated above are useful in the practice of the present invention and are within the full intended scope of the invention as disclosed herein.

The second layer in the composites of the invention is an acrylonitrile-styrene-acrylate rubber terpolymer such as that manufactured and sold by General Electric Company under the trademark GELOY®, and preferably an acrylate-modified acrylonitrile-styrene-acrylate rubber terpolymer. ASA polymeric materials include, for example, those disclosed in Kakefuda et al U.S. Pat. No. 3,711,575, incorporated herein by reference, which provides an ASA terpolymer, prepared by grafting acrylate to styrene/acrylonitrile copolymer. Acrylonitrile-styrene-acrylate rubber terpolymers are described in commonly assigned U.S. patent application Ser. Nos. 4,731,414 and 4,831,079, which are incorporated herein by reference. Such acrylonitrile-styrene-acrylate rubber terpolymers generally comprise 35 to 70 wt. % based on the total weight of the resin of an elastomeric phase comprising structural units derived from butyl acrylate. The elastomeric phase is dispersed in a rigid thermoplastic phase (the acrylonitrile and styrene), and at least a portion of the rigid thermoplastic phase is grafted to the elastomeric phase. In some embodiments of the invention where an acrylate-modified ASA is used, the ASA component further comprises an additional acrylate-graft formed from monomers selected from the group consisting of $C_1$ to $C_{12}$ alkyl and aryl-(meth) acrylate as part of either the rigid phase, the rubber phase, or both. Such copolymers are referred to herein as acrylate-modified acrylonitrile-styrene-acrylate rubber terpolymers, or acrylate-modified ASA. A preferred monomer is methylmethacrylate to result in a PMMA-modified ASA.

Acrylate-modified acrylonitrile-styrene-acrylate rubber terpolymers can be prepared by a method comprising the steps of:(a) polymerizing in a first stage in the presence of the elastomeric phase a monomer mixture of styrene and acrylonitrile in a wt./wt. ratio in a range of between about 1.5:1 and about 4:1, wherein the amount of monomer mixture employed is in a range of between about 15 wt. % and about 85 wt. % based on the total weight of monomer employed in all stages, followed by (b) polymerizing in a second stage in the presence of the elastomeric phase from (a), a mixture of styrene, acrylonitrile and an acrylate, wherein styrene and acrylonitrile are employed in a wt./wt. ratio in a range of between about 1.5:1 and about 4:1, and the wt./wt. ratio of the acrylate to the total of styrene and acrylonitrile is in a range of between about 3:1 and about 1:3. A portion of the styrene-acrylonitrile may also prepared in a separate polymerization step and may suitably be present at levels of 30% to 80 wt. % based on the weight of the entire composition.

The third layer in the composites of the invention comprises ABS or a modified ABS. Although originally the term "ABS" denoted a copolymer primarily constructed from acrylonitrile, butadiene and styrene, this definition has been expanded in recent years to include copolymer resins in which these components have been replaced in whole or in part by closely analogous compounds. The term ABS as used in the specification and claims of this application has the newer and broader meaning.

The vinyl aromatic compound in the ABS used present invention may be any of a variety of copolymerizable vinyl aromatic compounds, such as alpha-methyl styrene, halogenated styrenes such as chlorostyrene and dibromostyrene, alkyl styrenes such as vinyl toluene, vinyl anilines and styrene. Mixtures of different vinyl aromatic compounds may also be used. It is preferred, however, that the vinyl aromatic compound be selected from the group consisting of styrene, halogenated styrenes, alpha-methyl styrenes, alkyl styrenes and mixtures thereof. In the embodiment which is most preferred, the graft copolymer includes at least some styrene.

The acrylonitrile compound in the ABS used in the present invention is any copolymerizable acrylonitrile compound, such as acrylonitrile, halogenated acrylonitriles, methacrylonitrile, ethacrylonitrile, further alkyl acrylonitrile derivatives, and mixtures thereof. Other non-nitrilated acrylic compounds, such as methacrylate, methyl methacrylate, ethylacrylate and acrolein, may be present in relatively small amounts, constituting less than 20% by weight, and preferably less than 1 0% by weight, of the ABS graft copolymer. Acrylonitrile and/or methacrylonitrile are preferred. Most preferably, at least some acrylonitrile is included, such as in ABS graft copolymers which contain acrylonitrile as the principle acrylic compound while including a lesser amount of methacrylonitrile.

The rubber substrate (the B component in ABS) may be any of a variety of rubber substrates known in the art. However, preferred rubbers are those which include a diene rubber. Particularly preferred rubbers are polybutadiene rubbers and butadiene copolymer rubbers, such as copolymers of butadiene containing up to 35% of a copolymerizable monomer such as an acrylonitrile, an alkyl acrylate, an alkyl methacrylate or a vinyl aromatic monomer such as styrene. Alternatively, although less preferred than diene rubbers, other rubber substrates may be employed. Alternative materials include rubbers such as acrylic rubbers derived from alkyl acrylate homopolymer or copolymers, and normally including small amounts of di- or tri-functional crosslinking and graft linking monomers.

As is known in the art, the ABS of the present invention may also include minor amounts of various additives to improve the properties of the resin. Such additives include crosslinking monomers such as divinyl benzene, ethylene glycol dimethacrylate and the like. A great many of these graft copolymers are widely available commercially, or may be prepared according to any of a variety of known graft polymerization techniques. One such method involves copolymerizing the acrylonitrile monomer and the vinyl aromatic monomer in the presence of the previously formed rubber substrate. Typical methods for preparing traditional ABS graft polymers from styrene and acrylonitrile are found in U.S. Pat. No. 3,238,275. Also included in the invention as ABS graft copolymers are ABS-type resins prepared by blending a graft copolymer having a high rubber substrate content with a preformed rigid copolymer, such as a styrene-acrylonitrile copolymer (SAN), an acrylonitrile-alphamethylstyrene, styrene copolymer or the like.

The proportion of vinyl aromatic compound, acrylonitrile compound and rubber substrate will depend in part on the characteristics desired in the thermoplastic composition. It is preferred, however, that the ABS graft copolymer include at least 40% by weight of a combination of a vinyl aromatic and an acrylonitrile compound, and 60% or less by weight of a rubber substrate. More preferably, the ABS graft copolymer includes at least 50% by weight of a combination of a vinyl aromatic compound and an acrylonitrile compound, and 50% or less by weight of a rubber substrate.

The modified ABS useful in the third layer is formed by mixing ABS, ASA and a polymer modifier that decreases the softening of the ABS on contact with styrene.

Suitable modified ABS for use in the present invention comprise 7 to 93% by weight ABS, preferably 50 to 80%, 0.5 to 30% by weight acrylonitrile-styrene-acrylate, preferably 5 to 20% and 5 to 70% modifying polymer, preferably 5 to 40%. The modified ABS may be compounded to substantial homogeneity, or it may be a simple mixture of polymer pellets (sometimes referred to as a salt and pepper preparation) prior to coextrusion or other processing to form the composite.

In the modified ABS, the modifying polymer is suitably a polyacrylate such as PMMA, a polycarbonate, thermoplastic polyesters, polyolefins or mixtures thereof. The invention is illustrated below using polymethylmethacrylate as the modifying polymer, but this these examples are not intended to limit the invention.

The fourth layer of the invention, when present, comprises completely or predominantly a polyacrylate as described above. It may include minor amounts, for example up to 20%, of rubbery modifiers, including without limitation, ABS, modified ABS, ASA, and acrylate-modified ASA.

The composites of the invention are suitably used, with or without prior thermoforming into a desired shape, as a coating on a fiber-reinforced plastic surface to form a further embodiment of the composite of the invention Fiber-reinforced plastic is a material made from fiber reinforcement (for example glass fibers)in a plastic (polymer) matrix. The fiber-reinforced plastic may be applied to the optionally thermoformed composite as a spray of chopped fibers in resin, or it may be hand laid as sheets of fibrous material to which the plastic is applied, or applied by any other means known in the art.

EXAMPLE 1

Acrylate-modified ABS was prepared in a variety of mixtures as outlined in Table 1 using two types of ABS (GPP4600, a high modulus medium impact grade of ABS sold by GE Plastic and GX3800, a lower modulus, higher impact grade of ABS having a higher rubber content than GPP4600, also sold be GE Plastics), rubber-modified ASA, and two types of polymethylmethacrylate (DR-101 or VR826, both of which are commercially available ATOFINA Chemicals, Inc. V826 is characterized by a higher tensile strength, flexural modulus and hardness than DR-101) as summarized in Table 1.

TABLE 1

| Sample | 1 | 2 | 3 | 4 | 5 | 6 | 7 | 8 | 9 |
|---|---|---|---|---|---|---|---|---|---|
| % ABS | 65 | 65 | 60 | 80 | 55 | 50 | 42.5 | 60 | 42.5 |
| % Acrylic | 20 | 20 | 40 | 20 | 30 | 20 | 35 | 40 | 35 |
| % ASA | 15 | 15 | 0 | 0 | 15 | 30 | 22.5 | 0 | 22.5 |
| ABS type | GPP4600 | GPP4600 | GPP4600 | GPP4600 | GX3800 | GX3800 | GX3800 | GPP4600 | GPP4600 |
| PMMA type | V826 | V826 | V826 | V826 | DR | DR | DR | V826 | V826 |

| Sample | 10 | 11 | 12 | 13 | 14 | 15 | 16 | 17 | 18 |
|---|---|---|---|---|---|---|---|---|---|
| % ABS | 60 | 50 | 65 | 80 | 30 | 30 | 55 | 60 | 70 |
| % Acrylic | 40 | 20 | 20 | 20 | 40 | 40 | 30 | 40 | 30 |
| % ASA | 0 | 30 | 15 | 0 | 30 | 30 | 15 | 0 | 0 |
| ABS type | GX3800 | GPP4600 | GX3800 | GX3800 | GX3800 | GPP4600 | GX3800 | GX3800 | GX3800 |
| PMMA type | V826 | DR | V826 | DR | DR | DR | V826 | V826 | DR |

| Sample | 19 | 20 | 21 | 22 | 23 | 24 | 25 | 26 | 27 |
|---|---|---|---|---|---|---|---|---|---|
| % ABS | 50 | 65 | 50 | 60 | 80 | 42.5 | 55 | 30 | 60 |
| % Acrylic | 20 | 20 | 20 | 40 | 20 | 35 | 30 | 40 | 40 |
| % ASA | 30 | 15 | 30 | 0 | 0 | 22.5 | 15 | 30 | 0 |
| ABS type | GPP4600 | GPP4600 | GPP4600 | GPP4600 | GPP4600 | GX3800 | GPP4600 | GX3800 | GPP4600 |
| PMMA ypet | V826 | DR | DR | DR | DR | V826 | DR | V826 | 19 |

| Sample | 28 | 29 | 30 | 31 | 32 | 33 | 34 | 35 | 36 |
|---|---|---|---|---|---|---|---|---|---|
| % ABS | 55 | 60 | 42.5 | 50 | 80 | 30 | 65 | 30 | 30 |
| % Acrylic | 30 | 40 | 35 | 20 | 20 | 40 | 20 | 40 | 40 |
| % ASA | 15 | 0 | 22.5 | 30 | 0 | 30 | 15 | 30 | 30 |
| ABS type | GPP4600 | GX3800 | GPP4600 | GX3800 | GX3800 | GPP4600 | GX3800 | GX3800 | GPP4600 |
| PMMA type | V826 | DR | DR | V826 | V826 | V826 | DR | DR | DR |

| Sample | 37 | 38 | 39 | 40 | 41 | 42 | 43 |
|---|---|---|---|---|---|---|---|
| % ABS | 30 | 30 | 100 | 100 | | | |
| % Acrylic | 40 | 40 | | | | 100 | 100 |
| % ASA | 30 | 30 | | | 100 | | |
| ABS type | GX3800 | GPP4600 | GPP4600 | GX3800 | | | |
| PMMA type | V826 | V826 | | | | DR | VR826 |

Test samples 35–43 were formed as salt and pepper preparations by simple physical mixing while test samples 1–34 were formed as compounded and extruded blends. Test samples were applied to a fiber glass panel and the adhesion was determined for each test sample. Test samples in accordance with the invention, that contained either a modified ABS or an acrylic only layer performed better in the adhesion test than the unmodified ABS (samples 39 and 40) or ASA (sample 41).

EXAMPLE 2

While not intending to be bound by any specific mechanism, it is believed that the improved adhesion arises from decreased softening of the ABS by the resin of the fiberglass. Softening results in a delay in a decrease in the hardness of the product achieved, resulting in poorer adhesion. To explore this mechanism, test samples were prepared as summarized in Table 2 (using the same numbering as in Table 1).

TABLE 2

|         | 39  | 4  | 25 | 15 | 40  | 13 | 16 | 14 | 41  | 43  |
|---------|-----|----|----|----|-----|----|----|----|-----|-----|
| GPP4600 | 100 | 80 | 55 | 30 |     |    |    |    |     |     |
| GX3800  |     |    |    |    | 100 | 80 | 55 | 30 |     |     |
| ASA     |     |    | 15 | 30 |     |    | 15 | 30 | 100 |     |
| V826    |     | 20 | 30 | 40 |     | 20 | 30 | 40 |     | 100 |

Figure 5:
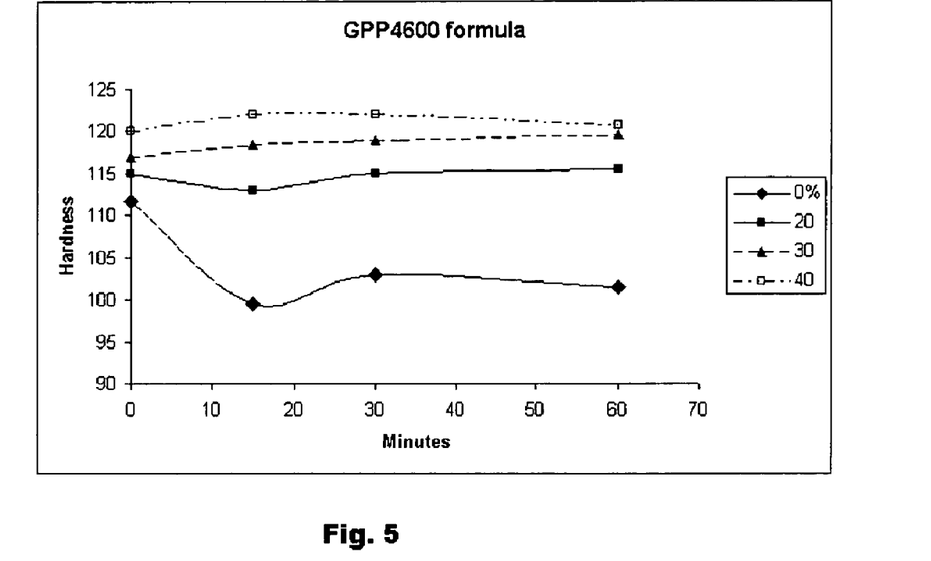
FIG. 5 shows the relationship of hardness to acrylic content in GPP4800-based samples.
Figure 6:
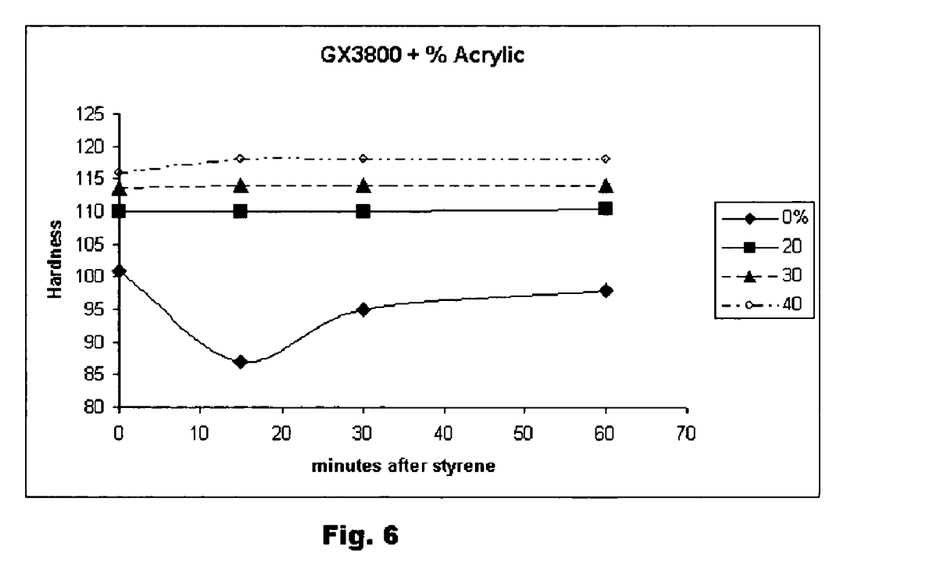
FIG. 6 shows the relationship of hardness to acrylic content in GX3800-based samples.

A sheet of the material was extruded and then the hardness of the material was tested following exposure to styrene. FIG. 5 shows the relationship of hardness to acrylic content in GPP4800-based samples. FIG. 6 shows the relationship of hardness to acrylic content in GX3800-based samples. In both cases, acrylic levels of 20, 30 and 40% result in substantially improvement in the hardness as compared to the sample without acrylate.

The invention claimed is:

1. A composite comprising, in sequence,
   an outer layer comprising acrylic,
   a second layer comprising acrylonitrile-styrene-acrylate rubber terpolymer;
   a third layer comprising an ABS polymer; and
   a polyacrylate fourth layer.

2. The composite of claim 1, wherein the outer layer is a UV stabilized acrylic.

3. The composite of claim 2, wherein the second layer of the composite comprises an acrylate-modified acrylonitrile-styrene-acrylate rubber terpolymer.

4. The composite of claim 3, wherein the third layer of the composite comprises ABS, an acrylonitrile-styrene-acrylate rubber terpolymer and a polymer modifier that decreases the softening of the ABS on contact with styrene.

5. The composite of claim 4, wherein the polymer modifier in the third layer is a polyacrylate.

6. The composite of claim 5, wherein the polyacrylate is polymethylmethacrylate.

7. A composite according to claim 1, wherein the composite further comprises a fiber reinforced plastic substrate adhered to the fourth layer.

8. The composite of claim 7, wherein the outer layer is a UV stabilized acrylic.

9. The composite of claim 8, wherein the second layer of the composite is a rubber modified acrylonitrile-styrene-acrylate rubber terpolymer.

10. The composite of claim 9, wherein the third layer of the composite comprises ABS, an acrylonitrile-styrene-acrylate rubber terpolymer and a polymer modifier that decreases the softening of the ABS on contact with styrene.

11. The composite of claim 10, wherein the polymer modifier in the third layer is a polyacrylate.

12. The composite of claim 11, wherein the polyacrylate is polymethylmethacrylate.

13. The composite of claim 7, wherein the third layer of the composite comprises ABS, an acrylonitrile-styrene-acrylate rubber terpolymer and a polymer modifier that decreases the softening of the ABS on contact with styrene.

14. The composite of claim 13, wherein the polymer modifier in the third layer is a polyacrylate.

15. The composite of claim 14, wherein the polyacrylate is polymethylmethacrylate.

16. The composite of claim 1, wherein the third layer further comprises polycarbonate.

17. A composite comprising, in sequence,
   an outer layer comprising acrylic,
   a second layer comprising acrylonitrile-styrene-acrylate rubber terpolymer and;
   a third layer comprising an ABS polymer; wherein the third layer of the composite comprises ABS a modified ABS polymer; wherein the modified ABS polymer comprises ABS, an acrylonitrile-styrene-acrylate rubber terpolymer and a polymer modifier that decreases the softening of the ABS on contact with styrene.

18. The composite of claim 17, wherein the polyacrylate in the third layer is a polyacrylate.

19. The composite of claim 18, wherein the polymer modifier is polymethylmethacrylate.

20. The composite according to claim 17, wherein the composite further comprises a fiber reinforced plastic substrate adhered to the third layer.

21. The composite of claim 20, wherein the polymer modifier in the third layer is a polyacrylate.

22. The composite of claim 21, wherein the polyacrylate is polymethylmethacrylate.

23. The composite of claim 20, wherein the composite further includes a UV stabilized acrylic top layer.

24. The composite of claim 23, wherein the second layer comprises a rubber modified acrylonitrile-styrene-acrylate rubber terpolymer.

25. The composite of claim 17, wherein the outer layer is a UV stabilized acrylic.

26. The composite of claim 17, wherein the third layer further comprises polycarbonate.

* * * * *